US008874581B2

(12) United States Patent
Shi et al.

(10) Patent No.: US 8,874,581 B2
(45) Date of Patent: Oct. 28, 2014

(54) EMPLOYING TOPIC MODELS FOR SEMANTIC CLASS MINING

(75) Inventors: Shuming Shi, Beijing (CN); Ji-Rong Wen, Beijing (CN)

(73) Assignee: Microsoft Corporation, Redmond, WA (US)

(*) Notice: Subject to any disclaimer, the term of this patent is extended or adjusted under 35 U.S.C. 154(b) by 335 days.

(21) Appl. No.: 12/846,064

(22) Filed: Jul. 29, 2010

(65) Prior Publication Data

US 2012/0030206 A1 Feb. 2, 2012

(51) Int. Cl.
*G06F 17/30* (2006.01)
(52) U.S. Cl.
CPC .... *G06F 17/30864* (2013.01); *G06F 17/30707* (2013.01)
USPC ........................................................ 707/738
(58) Field of Classification Search
USPC ........................................................ 707/738
See application file for complete search history.

(56) References Cited

U.S. PATENT DOCUMENTS

| | | | |
|---|---|---|---|
| 6,137,911 A * | 10/2000 | Zhilyaev | 382/225 |
| 7,613,995 B2 | 11/2009 | Wen et al. | |
| 2002/0169735 A1 | 11/2002 | Kil et al. | |
| 2004/0220902 A1 * | 11/2004 | Gates et al. | 707/3 |
| 2006/0026496 A1 | 2/2006 | Joshi et al. | |
| 2007/0005343 A1 | 1/2007 | Sandor et al. | |
| 2009/0094233 A1 * | 4/2009 | Marvit et al. | 707/5 |
| 2010/0010895 A1 | 1/2010 | Gabrilovich et al. | |
| 2010/0057716 A1 | 3/2010 | Stefik et al. | |

OTHER PUBLICATIONS

Employing Topic Models for Pattern-based Semantic Class Discovery by Huibin Zhang, Mingjie Zhu, Shuming Shi, and Ji-rong Wen, Aug. 2-9, 2009, p. 459-467.*
LDA-Based Document Models for Ad-hoc Retrieval by Xing Wei, and W. Bruce Croft, SIGIR'06, Aug. 6-11, 2006, Seattle, Washington USA, Copyright 2006 ACM 1-59593-369-7/06/0008.*
Blei, et al., "Latent Dirichlet Allocation", retrieved on Apr. 29, 2010 at <<http://www.cs.princeton.edu/~blei/papers/BleiNgJordan2003.pdf>>, JMLR.org , Journal of Machine Learning Research, vol. 3, Mar. 2003, pp. 993-1022.
Boyd-Graber, et al., "A Topic Model for Word Sense Disambiguation", retrieved on Apr. 29, 2010 at <<http://www.aclweb. org/anthology-new/D/D07/D07-1109.pdf>>, ACL, Proceedings of the Joint Conference on Empirical Methods in Natural Language Processing and Computational Natural Language Learning, Prague, Jun. 2007, pp. 1024-1033.

(Continued)

*Primary Examiner* — Robert Beausoliel, Jr.
*Assistant Examiner* — Hau H Hoang
(74) *Attorney, Agent, or Firm* — Dan Choi; Judy Yee; Micky Minhas

(57) ABSTRACT

A topic modeling architecture is used to discover high-quality semantic classes from a large collection of raw semantic classes (RASCs) for use in generating responses to queries. A specific semantic class is identified from a collection of RASCs, and a preprocessing operation is conducted to remove one or more items with a semantic class frequency less than a predetermined threshold. A topic model is then applied to the specific semantic class for each of the items that remain in the specific semantic class after the preprocessing operation. A postprocessing operation is then conducted on the items of the specific semantic class to merge and sort the results of the topic model and generate final semantic classes for use by a search engine to respond to a query.

20 Claims, 4 Drawing Sheets

(56) References Cited

OTHER PUBLICATIONS

Cai, et al., "Improving Word Sense Disambiguation Using Topic Features", retrieved on Apr. 29, 2010 at <<http://www.aclweb.org/anthology/D/D07/D07-1108.pdf>>, ACL, Proceedings of the Joint Conference on Empirical Methods in Natural Language Processing and Computational Natural Language Learning, Prague, Jun. 2007, pp. 1015-1023.

De Saeger, et al., "A Web Service for Automatic Word Class Acquisition", retrieved on Apr. 29, 2010 at <<http://portal.acm.org/citation.cfm?id=1667806>>, ACM, Proceedings of the International Universal Communication Symposium (IUCS), Tokyo, Japan, 2009, pp. 132-138.

Deerwester, et al., "Indexing by Latent Semantic Analysis", retrieved on Apr. 29, 2010 at <<http://lsi.research.telcordia.com/lsi/papers/JASIS90.pdf>>, Journal of the Society for Information Science, vol. 41, No. 6, 1990, pp. 391-407.

Ghahramani, et al., "Bayesian Sets", retrieved on Apr. 29, 2009 at <<http://www.gatsby.ucl.ac.uk/~heller/bsets.pdf>>, Advances in Neural Information Processing Systems (NIPS), Dec. 2005, pp. 1-8.

Griffiths, et al., "Integrating Topics and Syntax", retrieved on Apr. 29, 2010 at <<http://psiexp.ss.uci.edu/research/papers/composite.pdf>>, MIT Press, Advances in Neural Information Processing Systems (NIPS), vol. 17, 2005, pp. 537-544.

Hindle, "Noun Classification from Predicate-Argument Structures", retrieved on Apr. 29, 2010 at <<http://acl.ldc.upenn.edu/P/P90/P90-1034.pdf>>, ACL, Proceedings of the Meeting of the Association for Computational Linguistics, Pittsburg, PA, Jun. 1990, pp. 268-275.

Hofmann, "Probabilistic Latent Semantic Indexing", retrieved on Apr. 29, 2010 at <<http://www.cs.brown.edu/~th/papers/Hofmann-SIGIR99.pdf>>, ACM, Proceedings of the International Conference on Research and Development in Information Retrieval, Berkeley, CA, 1999, pp. 50-57.

Huang, et al., "Accurate Semantic Class Classifier for Coreference Resolution", retrieved on Apr. 29, 2010 at <<http://www.aclweb.org/anthology/D/D09/D09-1128.pdf>>, ACL and AFNLP, Proceedings of the Conference on Empirical Methods in Natural Language Processing, Singapore, Aug. 2009, pp. 1232-1240.

Jarvelin, et al., "IR evaluation methods for retrieving highly relevant documents", retrieved on Apr. 29, 2010 at <<http://citeseerxistpsu.edu/viewdoc/download?doi=10.1.1.20.2887&rep=rep1&type=pdf>>, ACM, Proceedings of the International Conference on Research and Development in Information Retrieval, New York, NY, 2000, pp. 41-48.

Kozareva, et al., "Semantic Class Learning from theWeb with Hyponym Pattern Linkage Graphs", retrieved on Apr. 29, 2010 at <<http://www.aclweb.org/antholohy/P/P08/P08-1119.pdf>>, ACL, Proceedings of Association for Technologies, Columbus, Ohio, Jun. 2008, pp. 1048-1056.

Li, et al., "Nonparametric Bayes Pachinko Allocation", retrieved on Apr. 29, 2010 at <<http://www.cs.princeton.edu/~blei/papers/LiBleiMcCallum2007.pdf>>, Proceedings of Conference on Uncertainty in Artificial Intelligence (UAI), 2007, pp. 1-8.

Lin, "Automatic Retrieval and Clustering of Similar Words", retrieved on Apr. 29, 2010 at <<http://www.aclweb.org/anthology-new/P/P98/P98-2127.pdf>>, ACL, Proceedings of the International Conference on Computational Linguistics, Montreal, Canada, vol. 2, 1998, pp. 768-774.

Lin, et al., "Induction of Semantic Classes from Natural Language Text", retrieved on Apr. 29, 2010 at <<http://delivery.acm.org/10.1145/510000/502558/p317-lin.pdf?key1=502558&key2=5600352721&coll=GUIDE&dl=GUIDE&CFID=86442442&CFTOKEN=33140505>>, ACM, Proceedings of the International Conference on Knowledge Discovery and Data Mining (KDD), San Francisco, Ca, 2001, pp. 317-322.

Ohshima, et al., "Searching Coordinate Terms with Their Context from the Web", retrieved on Apr. 29, 2010 at <<http://www.springerlink.com/content/j334176733853983/fulltext.pdf>>, Springer-Verlag Berlin, Lecture Notess in Computer Science vol. 4255, Proceedings of the International Conference on Web Information Systems Engineering (WISE), 2006, pp. 40-47.

Pantel, et al., "Discovering Word Senses from Text", retrieved on Apr. 29, 2010 at <<http://www.patrickpantel.com/Download/Papers/2002/kdd02.pdf>>, ACM, Proceedings of the International Conference on Knowledge Discovery and Data Mining (KDD), Edmonton, Canada, Jul. 2002, pp. 613-619.

Pasca, "Acquisition of Categorized Named Entities for Web Search", retrieved on Apr. 29, 2010 at <<http://delivery.acm.org/10.1145/1040000/1031194/p137-pasca.pdf?key1=1031194&key2=2930352721&coll=GUIDE&dl=GUIDE&CFID=88372892&CFTOKEN=23737573>>, ACM, Proceedings of the International Conference on Information and Knowledge Management (CIKM), Nov. 2004, pp. 137-145.

Schein, et al., "Methods and Metrics for Cold-Start Recommendations", retrieved on Apr. 29, 2010 at <<http://dpennock.com/papers/schein-sigir-2002-cold-start.pdf>>, ACM, Proceedings of the International Conference on Research and Development in Information Retrieval, Tampere, Finland, Aug. 2002, pp. 253-260.

Shi, et al., "Pattern-based Semantic Class Discovery with Multi-Membership Support", retrieved on Apr. 29, 2010 at <<http://delivery.acm.org/10.1145/1460000/1458329/p1453-shi.pdf?key1=1458329&key2=6850352721&coll=GUIDE&dl=GUIDE&CFID=88373290&CFTOKEN=39711754>>, ACM, Proceedings of the International Conference on Information and Knowledge Management (CIKM), Napa Valley, CA, Oct. 2008, pp. 1453-1454.

Shinzato, et al., "A Simple WWW-based Method for SemanticWord Class Acquisition", retrieved on Apr. 29, 2010 at <<https://nats-www.informatik.uni-hamburg.de/intern/proceedings/2005/RANLP/papers/64_shinzato.pdf>>, Proceedings of the Recent Advances in Natural Language Processing (RANLP), 2005, pp. 493-500.

Shinzato, et al., "Acquiring Hyponymy Relations from Web Documents", retrieved on Apr. 29, 2010 at <<http://www.aclweb.org/anthology/N/N04/N04-1010.pdf>>, ACL North American chapter, Proceedings of Human Language Technology Conference (HLT), 2004, pp. 73-80.

Turney, et al., "From Frequency to Meaning: Vector Space Models of Semantics", retrieved on Apr. 29, 2010 at <<http://www.jair.org/media/2934/live-2934-4846-jair.pdf>>, AI Access Foundation and National Research Council Canada, Journal of Artificial Intelligence Research, vol. 37, 2010, pp. 141-188.

Wang, et al., "Language-Independent Set Expansion of Named Entities using the Web", retrieved on Apr. 29, 2010 at <<http://citeseerx.ist.psu.edu/viewdoc/download;jsessionid=5CEB3E4FDE352E86B24CC66C9AE947B2?doi=10.1.1.68.6493&rep=rep1&type=pdf>>, IEEE Computer Society, Proceedings of the International Conference on Data Mining (ICDM), 2007, pp. 342-350.

\* cited by examiner

EMPLOYING TOPIC MODELS FOR SEMANTIC CLASS MINING

BACKGROUND

Semantic class construction discovers peer or sibling relationships among terms or phrases by organizing the terms or phrases into semantic classes. Semantic classes are typically used by a search engine in response to a query to categorize potential responses to the query. For example, {red, white, black . . . } is a semantic class consisting of color instances. Existing methods have typically used a pattern-based approach for semantic class discovery. In a pattern-based approach, predefined patterns are applied to a collection of web pages or used by an online web search engine to produce raw semantic classes (RASCs). Predefined patterns identify certain semantic class categories ahead of time and apply those categories to information in the collection of web pages. However, RASCs are typically noisy and incomplete, and therefore are not treated as usable semantic classes. In addition, the information of one semantic class may be distributed in many RASCs. This issue of multi-membership in which one item may belong to multiple different raw semantic classes has very limited support in existing pattern-based approaches. For example, in a typical pattern based approach, RASCs are labeled according to the predefined patterns. RASCs with the same labels (or hypernyms) are merged to generate the ultimate semantic classes. This is problematic, because some RASCs may not have accurate hypernyms and, in some cases, a RASC may not have a hypernym at all. The inaccuracy and/or lack of hypernyms in existing pattern based approaches not only creates lower quality search results, but also makes it difficult to identify the multi-membership semantic classes.

SUMMARY

A topic model is used to discover high-quality semantic classes from a large collection of raw semantic classes (RASCs). A semantic class is a collection of items (words or phrases) that are semantic peers or siblings. Semantic classes may be used by a search engine in response to a query to categorize potential responses to the query in categories relating to the query. Initially, a collection of RASCs is extracted by applying predefined patterns to web pages. A topic model is then applied to the collection of raw semantic classes to automatically construct final semantic classes. One challenge arises from the fact that a particular item may belong to multiple raw semantic classes, and the different final semantic classes to which an item belongs should be identified for each of the multiple raw semantic classes. In a topic model architecture, RASCs are treated as "documents", items as "words", and the final semantic classes as "topics". Appropriate preprocessing and postprocessing operations are performed to improve results quality, reduce computation cost, and address the fixed-k constraint of a typical topic model.

In one embodiment, a specific raw semantic class is identified from the collection of RASCs and a preprocessing operation is conducted on the specific raw semantic class to remove items with a semantic class frequency less than a predetermined threshold. A semantic class frequency is the number of times an item appears in a particular semantic class. A topic model is then applied to the specific raw semantic class for each of the items that remain in the specific raw semantic class after the preprocessing operation. The topic model is applied to further refine the raw semantic classes and categorize each of the items in the raw semantic classes into topics. A postprocessing operation is then conducted on the items remaining from the application of the topic model to merge and to sort the results of the topic model and generate final semantic classes for use by a search engine in response to a query.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Overview

In a topic model approach to a pattern based semantic class discovery architecture, final semantic classes that are used to develop a response to a query are discovered by applying a topic model to a collection of raw semantic classes (RASCs). In order to refine the RASCs, a preprocessing operation is applied to the RASCs to remove items with a semantic class frequency less than a predetermined threshold. The topic model is then applied to further refine the raw semantic classes and categorize each of the items in the raw semantic classes into topics. A postprocessing operation is then conducted on the items remaining from the application of the topic model to merge and to sort the results of the topic model and generate final semantic classes for use by a search engine in response to a query.

The foregoing explanation provides a brief overview of the topic model architecture, however, a more detailed description follows. An illustrative architecture is described followed by a description of an illustrative process.

Illustrative Architecture

Figure 1:
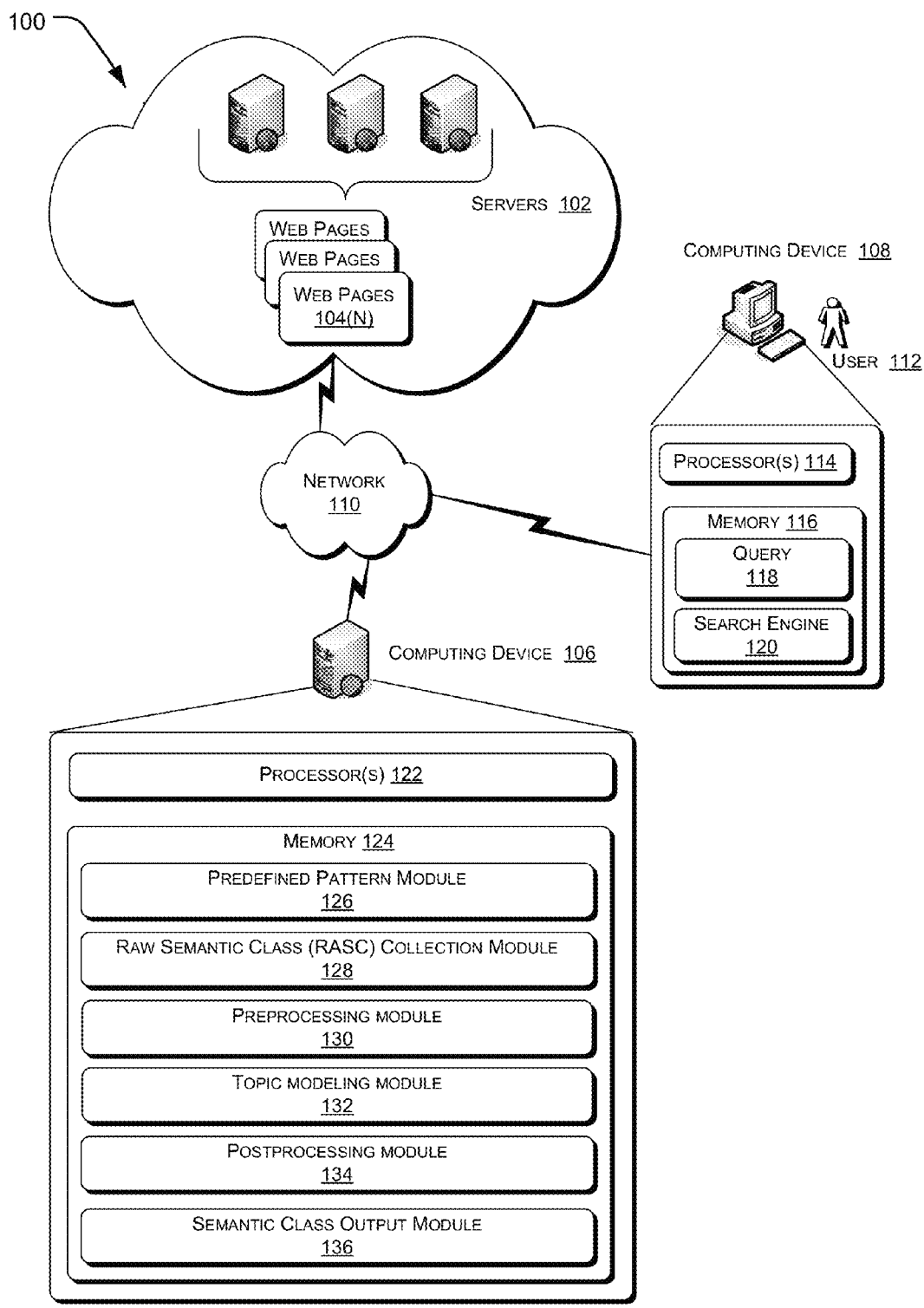
FIG. 1 is a block diagram that illustrates an example topic model architecture.

FIG. 1 illustrates a topic model architecture 100. Topic model architecture 100 includes one or more servers 102 that serve web pages 104, a server computing device 106 for processing raw semantic classes, and client computing device 108 through which a user submits Internet searches. Servers 102, server computing device 106, and client computing device 108 are communicatively coupled to one another through a network 110. In an example implementation, a user 112 provides input to client computing device 108. Alternatively, the input may also be received from other sources such as an application. The client computing device 108 contains one or more processors 114 and memory 116. The user 112 inputs a query 118 into a search engine 120, which is configured to search against web pages 104 over the network 110.

Server computing device 106 includes one or more processors 122 and memory 124. A predefined pattern module 126, raw semantic class (RASC) collection module 128, preprocessing module 130, topic modeling module 132, postprocessing module 134, and semantic class output module 136 are stored in memory 124 and executed on the processors 122.

Predefined pattern module 126 applies a predefined pattern of semantic class categories to one or more RASCs pertaining to a particular query. The application of a predefined pattern refines the broad information from the collection of web pages into a more manageable form, i.e. the predefined pattern module extracts RASCs from the web pages. Consequently, the input is a collection of web pages and the output is the RASC collection. The patterns may be predefined and may be applied in a predefined pattern module 126. The predefined pattern may be any pattern that serves to reduce or filter the number of semantic classes in a first or rough cut to reduce the sheer size of the raw semantic class collection. Using the predefined pattern module 126, the RASC collection module 128 extracts a raw semantic class (RASC) collection. By design, this rough cut typically results in "noisy" and incomplete semantic classes. A "noisy" semantic class contains extraneous information that is not pertinent or helpful in finalizing a semantic class that is helpful to forming a response to the query 118. In addition, since the information of one final semantic class may be distributed in many of the individual RASCs, the pattern may identify many of these RASCs. An example of a predefined pattern is shown below in Table 1 and an example of the resulting RASCs from application of a predefined pattern is shown below in Table 2.

TABLE 1

Sample patterns

| Type | Pattern |
| --- | --- |
| SENT | NP (Noun Phrase) {, NP}*{,} (and\|or) {other} NP |
| TAG | <UL> <LI>item</LI> ... <LI>item</LI> </UL> |
| TAG | <SELECT> <OPTION>item...<OPTION>item </SELECT> |

*SENT: Sentence structure patterns; TAG: HTML Tag patterns

TABLE 2

Sample raw semantic classes (RASCs)

$R_1$: {gold, silver, copper, coal, iron, uranium}
$R_2$: {red, yellow, color, gold, silver, copper}
$R_3$: {red, green, blue, yellow}
$R_4$: {HTML, Text, PDF, MS Word, Any file type}
$R_5$: {Today, Tomorrow, Wednesday, Thursday, Friday, Saturday, Sunday}
$R_6$: {Bush, Iraq, Photos, USA, War}

The RASC collection module 128 then uses the information resulting from the predefined pattern module 126 to create a RASC database that contains items categorized in raw semantic classes. The topic model architecture is then applied to this database.

After the RASC collection module 128 has created the RASC database containing raw semantic classes, the preprocessing module 130 is applied to the RASC database. The preprocessing module 130 is applied to the raw semantic classes to further refine the RASC database and further reduce the number of raw semantic classes to increase the efficiency of the topic model. The preprocessing module 130 removes the low frequency items and/or semantic classes from the RASC database. For instance, an item is removed if it has a frequency less than a predetermined threshold h. The frequency is the number of RASCs containing the item. After the removal of the items, a RASC itself could be discarded if it contains less than a certain number of items after the item removal operations. This preprocessing operation helps the topic model to operate more efficiently by reducing the number of items and/or RASCs to be modeled.

The topic modeling module 132 is applied to the RASC collection resulting from the preprocessing operation after removal of the low frequency items. Topic modeling provides a formal and convenient way of grouping "documents" and "words" according to "topics". In order to apply topic models, RASCs are mapped to "documents", items to "words", and the output "topics" yielded from topic modeling are treated as semantic classes as described in more detail below in FIG. 2.

The postprocessing module 134 is then applied to the output semantic classes or topics resulting from the topic modeling module 132. The postprocessing module 134 merges and sorts the results of the topic model and generates final semantic classes for use by the search engine 120 in response to a query 118.

The semantic class output module 136 creates an output containing the final semantic classes that are used by the search engine 120 in response to a query 118.

As described above, the topic modeling architecture 100 is implemented by a computing system environment. For instance, the components of a computing system within the environment can include, but are not limited to, one or more processors (e.g., any of microprocessors, controllers, and the like), a system memory, and a system bus that couples the various system components. The one or more processors process various computer executable instructions to control the operation of the computing system and to communicate with other electronic and computing devices. The system bus represents any number of several types of bus structures, including a memory bus or memory controller, a peripheral bus, an accelerated graphics port, and a processor or local bus using any of a variety of bus architectures.

The computing system may be implemented using any form of computer-readable media. Computer-readable media may include, for example, computer storage media and communications media. Computer storage media is configured to store data on a non-transitory tangible medium, while communications media is not.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Figure 2:
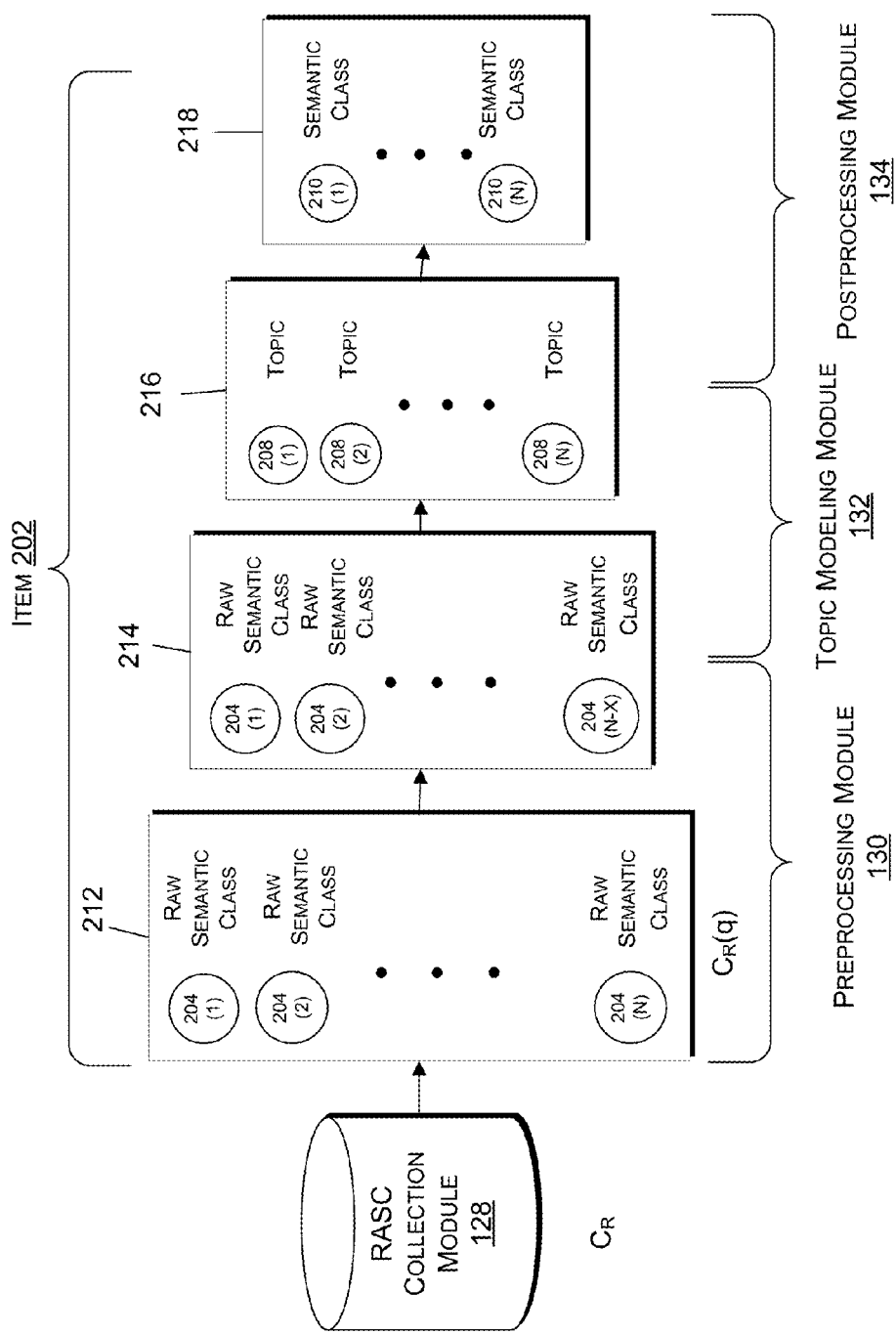
FIG. 2 is a block diagram that illustrates example phases of a topic model architecture.

FIG. 2 shows example phases of processing performed within the topic modeling architecture 100. In the illustrated example, an item 202 is selected from the RASC collection extracted by the RASC collection module 128.

The source data for the RASC collection module 128 of this topic model architecture 100 is a collection (denoted as $C_R$) of RASCs extracted by applying patterns to a large collection of web pages 104(N) as described above. The RASC collection for a particular item q is called $C_R(q)$ in this document.

Preprocessing module 130 processes the collection $C_R$. The source data 212 from the collection $C_R$ includes raw semantic class data 212. The preprocessing module 130 reduces the data in the raw semantic classes 204(1)...204(N) to 204(1)...204(N-X) by removing from each RASC, items with a frequency (i.e., the number of RASCs containing the item) that is less than a predetermined threshold. In addition, as stated earlier, a particular RASC may be discarded from the RASC collection if it contains less than two items, or some other predetermined quantity, after the item-removal operations. The preprocessing results in the reduced semantic class data 214.

The topic modeling module 132 processes the data from the reduced semantic class data 214 by applying a topic model to the reduced raw semantic classes 204(1)...204(N-X). The topic modeling module 132 is applied to the RASC collection 214 resulting from the preprocessing module 130 after removal of the low frequency items. Topic modeling provides a formal and convenient way of grouping "documents" and "words" according to "topics". In order to apply topic models, RASCs are mapped to "documents", items to "words", and the output "topics" yielded from topic modeling are treated as semantic classes as shown below in Table 3.

TABLE 3

Mapping from concepts in topic modeling to topics in semantic class construction

| Topic modeling | Semantic class construction |
|---|---|
| word | item (word or phrase) |
| document | RASC |
| topic | semantic class |

Consequently, one item may belong to multiple semantic classes. In topic modeling, a word may appear in multiple topics such that some RASCs may include items that are found in multiple semantic classes. At the same time, one document may be related to multiple topics in some topic models. Multi-membership (i.e., one item belonging to multiple different semantic classes) posses some specific challenges. For example, the term "Lincoln" can simultaneously represent a person, a place, or a car brand name. Multi-membership is more common than it may appear at a first glance, because many common English words have also been borrowed as company names, places, or product names. To effectively address multi-membership, according to topic model architecture 100, for a given item (as a query) that belongs to multiple semantic classes, the semantic classes are returned separately rather than mixing the items together.

There are two widely used topic models which may preferably be used in the topic model architecture 100, although other topic models may also be used. Both topic models model a document as a mixture of hidden topics. The words of every document are assumed to be generated via a generative probability process. The parameters of the model may be estimated from a training process over a given corpus, by maximizing the likelihood of generating the corpus. The model may then be utilized to infer a new document. The two topic models are briefly described below.

The probabilistic latent semantic indexing model (pLSI) was introduced in a paper by Thomas Hofmann. 1999. Probabilistic latent semantic indexing. In *Proceedings of the 22nd annual international ACM SIGIR99*, pages 50-57, New York, N.Y., USA. ACM. The following process illustrates how to incorporate pLSI in the topic modeling approach to generate a document d in pLSI:

1. Pick a topic mixture distribution $p(\cdot|d)$.
2. For each word $w_i$ in d
   a. Pick a latent topic z with the probability $p(z|d)$ for $w_i$
   b. Generate $w_i$ with probability $p(w_i|z)$ So with k latent topics, the likelihood of generating a document d is $$p(d) = \prod_i \sum_z p(w_i|z)p(z|d) \quad (1)$$

In the second topic model, latent dirichlet allocation (LDA), the topic mixture is drawn from a conjugate dirichlet prior that remains the same for all documents. The generative process for each document in the corpus is:

1. Choose document length N from a Poisson distribution Poisson($\xi$).
2. Choose $\theta$ from a Dirichlet distribution with parameter $\alpha$.
3. For each of the N words $w_i$.
   a. Choose a topic z from a Multinomial distribution with parameter $\theta$.
   b. Pick a word $w_i$ from $p(w_i|z, \beta)$.

So the likelihood of generating a document is $$p(d) = \int_\theta p(\theta|\alpha) \prod_i \sum_z p(z|\theta)p(w_i|z, \beta) d\theta \quad (2)$$

For an item q, topic modeling is adopted to process the RASCs in $C_R(q)$ to generate k semantic classes. LDA may be used to illustrate the process. The case of other generative topic models (e.g., pLSI) is very similar.

According to the assumption of LDA and the concept mapping in Table 3 above, a RASC ("document") is viewed as a mixture of hidden semantic classes ("topics"). The generative process for a RASC R in the "corpus" $C_R(q)$ is as follows:

1) Choose a RASC size (i.e., the number of items in R): $N_R \sim \text{Poisson}(\xi)$.
2) Choose a k-dimensional vector $\theta_R$ from a Dirichlet distribution with parameter $\alpha$.
3) For each of the $N_R$ items $a_n$:
   a) Pick a semantic class $z_n$ from a multinomial distribution with parameter $\theta_R$.
   b) Pick an item $a_n$ from $p(a_n|z_n, \beta)$, where the item probabilities are parameterized by the matrix $\beta$.

There are three parameters in the model: $\xi$ (a scalar), $\alpha$ (a k-dimensional vector), and $\beta$ (a k×V matrix where V is the number of distinct items in $C_R(q)$). The parameter values may be obtained from a training (also called parameter estimation) process over $C_R(q)$, by maximizing the likelihood of generating the corpus. Once $\beta$ is determined, $p(a|z, \beta)$ is computed, the probability of item a belonging to semantic class z. Therefore the members of a semantic class z may be determined by selecting those items with high $p(a|z, \beta)$ values.

The number of topics k is assumed known and fixed in LDA. A constant k value is set for all different $C_R(q)$. The postprocessing module 134 may be used to merge the semantic classes produced by the topic model to generate the ultimate or final semantic classes in the semantic class output module 136.

In most topic modeling applications, the words within a resultant topic are typically semantically related but may not be peers. In the topic model architecture 100, the "documents" used in employing topic models contain words that co-occur in real documents and tend to be semantically related. In addition, items that co-occur in RASCs tend to be peers. Consequently, according to topic model architecture 100, most of the items in the same output semantic class have a peer relationship.

When topic modeling is used in document classification, an inference procedure is required to determine the topics for a new document. However, this inference is not necessary when using topic modeling to determine the final semantic class.

The output topics 206(1) . . . 206(N) yielded from topic modeling are treated as semantic classes and the output topics 206(1) . . . 206(N) are then processed by the postprocessing module 134. The postprocessing module 134 merges the topics treated as semantic classes from the topic modeling module 132 and sorts the items in each semantic class to create a final semantic class 208(1) . . . 208(N) that is used to create a response to a query in a search engine.

In the postprocessing phase, the output semantic classes ("topics") of topic modeling may be merged to generate the ultimate or final semantic classes. The number of topics is fixed, e.g., k=5, for different corpus $C_R(q)$ in employing topic models. For most items q, this is a larger value than the real number of semantic classes to which the item belongs. As a result, one real semantic class may be divided into multiple topics. Therefore, one operation in this phase is to merge those topics into one semantic class. In addition, the items in each semantic class should be properly ordered. Thus operations in the postprocessing module 134 include a merge process for merging the semantic classes and a sort process for sorting the items in each semantic class.

The merge process is performed by repeatedly calculating the similarity between two semantic classes and merging the two semantic classes with the highest similarity until the similarity is lower than a predefined threshold. One simple and straightforward similarity measure is the Jaccard coefficient, $$sim(C_1, C_2) = \frac{|C_1 \cap C_2|}{|C_1 \cup C_2|} \quad (3)$$

where $C_1 \cap C_2$ and $C_1 \cup C_2$ are respectively the intersection and union of semantic classes $C_1$ and $C_2$. However, this formula may be an oversimplification in some instances, because the similarity between two different items is not exploited. Consequently, the following formula may also be used:

$$sim(C_1, C_2) = \frac{\sum_{a \in C_1} \sum_{b \in C_2} sim(a, b)}{|C_1| \cdot |C_2|} \quad (4)$$

where |C| is the number of items in semantic class C, and sim(a,b) is the similarity between items a and b.

In the sort process, an importance score is assigned to every item in a semantic class and the items are sorted according to the importance scores. Intuitively, an item should get a high rank if the average similarity between the item and the other items in the semantic class is high, and if it has high similarity to the query item q. Thus the importance of item a in a semantic class C is calculated as follows:

$$g(a|C) = \lambda \cdot sim(a,C) + (1-\lambda) \cdot sim(a,q) \quad (5)$$

where $\lambda$ is a parameter in [0,1], sim(a,q) is the similarity between a and the query item q, and sim(a,C) is the similarity between a and C, calculated as, $$sim(a, C) = \frac{\sum_{b \in C} sim(a, b)}{|C|} \quad (6)$$

Formulas 4, 5, and 6 rely on the calculation of the similarity between two items. A simple way of estimating item similarity is to count the number of RASCs containing both of the items. Further, the similarity concept may be further extended by distinguishing the reliability of different patterns and punishing term similarity contributions from the same site. The resultant similarity formula is:

$$sim(a, b) \sum_{i=1}^{m} \log\left(1 + \sum_{j=1}^{k_i} w(P(C_{i,j}))\right) \quad (7)$$

where $C_{i,j}$ is a RASC containing both a and b, $P(C_{i,j})$ is the pattern via which the RASC is extracted, and w(P) is the weight of pattern P. If it is assumed these RASCs belong to m sites with $C_{i,j}$ extracted from a page in site i, and $k_i$ being the number of RASCs corresponding to site I, the weight of every type of pattern may be determined by randomly selecting 50 RASCs for each pattern and labeling their quality. The weight of each kind of pattern is then determined by the average quality of all labeled RASCs corresponding to a particular pattern.

Once the final semantic class is output from the semantic class output module 136, the final semantic class may be used to finalize a high quality response to the query 118 initiated by the user 112.

In an additional embodiment, the topic modeling architecture 100 receives a query item q and returns the semantic classes containing the query. In most applications, the maximal query processing time should not be larger than several seconds due to an unacceptable wait time by the user. Although the average query processing time of this approach is typically less than 1 second, a popular item such as "Washington" may take much longer, because it is contained in many different RASCs. In order to reduce the maximal online processing time, offline processing of popular items may be performed and the resultant semantic classes stored on a disk or some other type of memory.

Illustrative Process

Figure 3:
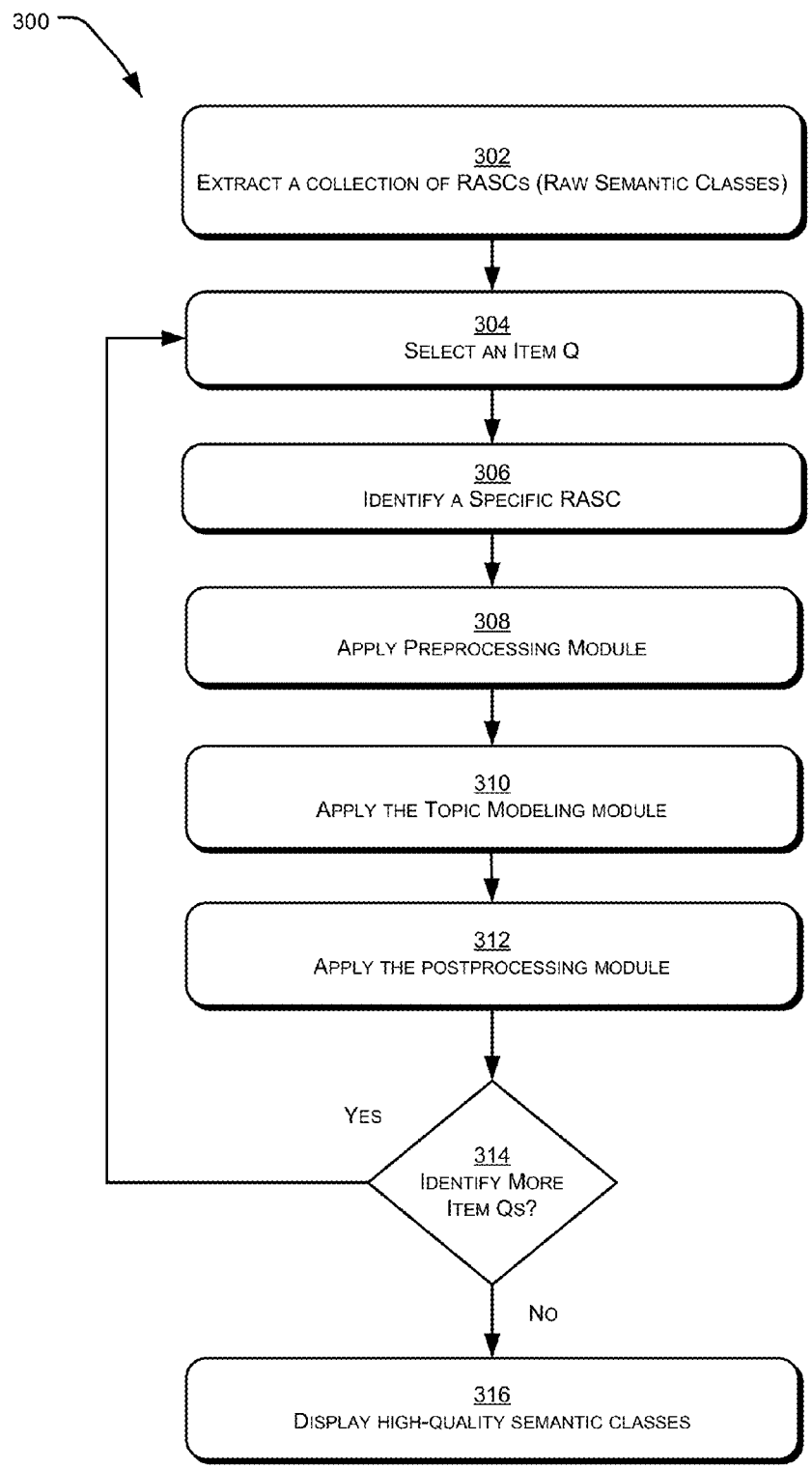
FIG. 3 is a flow diagram of an illustrative process for implementing an example topic model architecture.
Figure 4:
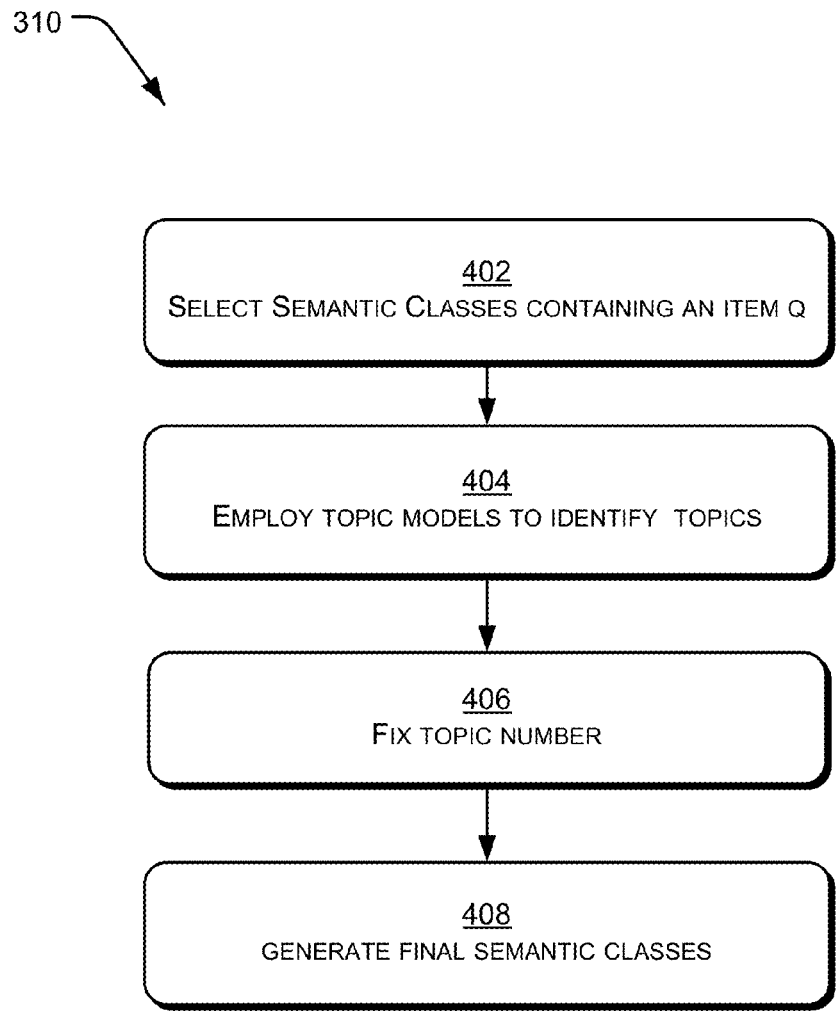
FIG. 4 is a flow diagram of an illustrative process for implementing an example topic model.

FIG. 3 and FIG. 4 are flow diagrams of functions and processes for employing topic models for semantic class modeling. The functions and processes described herein are represented by a sequence of operations that can be implemented by or in hardware, software, or a combination thereof. In the context of software, the blocks represent computer executable instructions that are stored on computer readable media and that when executed by one or more processors perform the recited operations and functions. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 3 is an illustrative process 300 for implementing a topic model architecture for semantic class mining. In operation 302, a collection of RASCs is extracted from a plurality of web pages by applying a predefined pattern to the source data from the web pages. For example, preprocessing module 130 uses predefined pattern module 126 to extract a collection of RASCs from web pages 104.

In operation 304, an item, Q, is selected to identify a specific RASC, and in operation 308, a preprocessing module is applied. For example, preprocessing module 130 process raw semantic data 212 containing raw semantic classes 204(1) . . . 204(N) to create reduced raw semantic data 214 containing reduced raw semantic classes 204(1) . . . (204(N-X) by removing the low frequency items and/or semantic classes from the RASC database.

A topic modeling module is applied in operation 310 and a postprocessing module is applied in operation 312. For example, topic modeling module 132 is applied to reduced raw semantic data 214 to create topics 208(1) . . . 208(N) that are treated as semantic classes and are processed by postprocessing module 134 to create final semantic class data 218.

In operation 314, a determination is made whether to identify an additional item or items Q. If the determination is "yes", the process returns to operation 304 and repeats. If the determination is "no", the process proceeds to operation 316 and a high quality final semantic class is provided for use by search engine 120 in response to query 118.

FIG. 4 is an illustrative process 310 for implementing the topic model. In operation 402, semantic classes containing an item Q are selected instead of selecting the entire RASC collection. For example, the RASC collection 214 resulting from the preprocessing module 130 can be used. Topic models are employed in operation 404 to identify topics using the concept mapping described above. For example, the topic modeling module 132 is applied to the RASC data 214 to create topics 208(1) . . . 208(N) that are treated as semantic classes.

In operation 406, a topic number is fixed for all items Q larger than the number of classes to which an item could belong. For instance, the number of topics is fixed, e.g., k=5, for different corpus $C_R(q)$ in employing topic models. As a result, one real semantic class may be divided into multiple topics. Final semantic classes are generated in operation 408 as the result of the postprocessing operation that merges and sorts the results of the topic models. For example, the postprocessing module 134 merges and sorts the topic data 216 to create a final semantic class 218 that is used in search engine 120 in response to query 118.

Although the subject matter herein has been described in language specific to structural features and/or methodological operations, it is to be understood that the subject matter defined in the appended claims is not necessarily limited to the specific features or operations described above. Rather, the specific features and acts described above are disclosed as example forms of implementing the claims.

The invention claimed is:

1. A method comprising:
responsive to receiving a query item, identifying a first semantic class collection from a collection of web pages, the first semantic class collection comprising at least one raw semantic class, each raw semantic class containing the query item;
creating a second semantic class collection by removing from the first semantic class collection, one or more items with a semantic class frequency less than a predetermined threshold, wherein the semantic class frequency is the number of times an item of the one or more items appears in a particular semantic class, the second semantic class collection comprising the semantic classes remaining after the removing from the first semantic class collection, each remaining semantic class containing the query item;
applying a topic model to the second semantic class collection for each of a plurality of items in the second semantic class collection to generate a plurality of topics, wherein applying the topic model comprises setting a topic number for each of the plurality of topics based on a number of semantic classes to which each of the plurality of topics could belong, the topic number being larger than the number of semantic classes to which each of the plurality of topics could belong; and
generating a final semantic class collection by merging and sorting the plurality of topics to generate a plurality of final semantic classes for use by a search engine in response to the query item, wherein the plurality of final semantic classes are based at least in part on the query item.

2. The method of claim 1, wherein identifying the first semantic class collection comprises applying a predefined pattern to the collection of web pages.

3. The method of claim 1, wherein the one or more items with the semantic class frequency less than the predetermined threshold belong to multiple semantic classes within the first semantic class collection.

4. The method of claim 1, wherein applying the topic model further comprises:
mapping the second semantic class collection to a plurality of documents, each document in the plurality of documents containing the query item;
mapping each of the plurality of items in the second semantic class collection to individual words of a plurality of words in individual documents of the plurality of documents; and
treating the plurality of topics that are generated as a plurality of semantic classes.

5. The method of claim 4, wherein the plurality of words in a particular document are generated by a generative probability process according to a word distribution over topics corresponding to the particular document.

6. The method of claim 4, wherein each semantic class in the second semantic class collection is a document.

7. The method of claim 4, wherein the topic model utilizes a topic mixture distribution to generate a document.

8. The method of claim 4, wherein the topic model utilizes a Dirichlet distribution across the plurality of documents.

9. The method of claim 1, wherein the plurality of topics are generated using a parameter estimation procedure.

10. The method of claim 1, wherein generating the final semantic class collection comprises:
repeatedly calculating a similarity between a plurality of semantic classes in the final semantic class collection and merging the plurality of semantic classes with a highest similarity until a similarity measurement is under a predetermined similarity threshold.

11. The method of claim 10, wherein generating the final semantic class collection further comprises sorting a first item from the plurality of topics according to an importance score, the importance score being used to rank the first item higher than a second item if:
an average similarity between the first item and other items is higher than a similarity between the first item and the second item; or a similarity of the first item to a predefined pattern is higher than a similarity between the second item and the predefined pattern.

12. The method of claim 11, wherein generating the final semantic class collection further comprises calculating the similarity between the first item and the second item by distinguishing a reliability of different patterns.

13. The method of claim 1, wherein applying the topic model further comprises:
using the topic number to determine the plurality of topics used to generate the plurality of final semantic classes.

14. A system comprising:
a memory;
one or more processors operatively coupled to the memory and disposed within one or more devices;
a collection component for constructing a database that includes a plurality of semantic classes from which a first semantic class collection is selected, the first semantic class collection comprising at least one raw semantic class, each raw semantic class containing a query item;
a preprocessing component for creating a second semantic class collection by identifying and removing from the first semantic class collection, one or more items with a semantic class frequency less than a predetermined threshold, wherein the semantic class frequency is the number of times an item of the one or more items appears in a particular semantic class, the second semantic class collection comprising the semantic classes remaining after the identifying and removing from the first semantic class collection, each remaining semantic class containing the query item;
a topic modeling component configured to apply a topic model to the second semantic class collection to create a plurality of topics, the topic modeling comprising setting a topic number for each of the plurality of topics based on a number of semantic classes to which each of the plurality of topics could belong, the topic number being larger than the number of semantic classes to which each of the plurality of topics could belong; and
a postprocessing component configured to merge the plurality of topics to generate a final semantic class collection for use in generating a response to the query item, wherein the final semantic class collection is based at least in part on the query item.

15. The system of claim 14, wherein the one or more items belong to multiple semantic classes within the second semantic class collection.

16. The system of claim 14, wherein the postprocessing component is further configured to sort a first item from the plurality of topics according to an importance score, the importance score being used to rank a first item higher than a second item if:
an average similarity between the first item and other items is higher than a similarity between the first item and the second item; or
a similarity of the first item to a predefined pattern is higher than a similarity between the second item and the predefined pattern.

17. The system of claim 16, wherein the postprocessing component is further configured to calculate the similarity between the first item and the second item by distinguishing a reliability of different patterns.

18. A computer readable storage medium comprising processor-executable instructions that, when executed on one or more processors, perform operations comprising:
responsive to receiving a query item, applying a predefined pattern to a plurality of web pages to extract a collection of semantic classes;
identifying a first semantic class collection from the collection of semantic classes, each semantic class containing the query item;
conducting a preprocessing operation on the first semantic class collection to remove one or more items with a semantic class frequency less than a predetermined threshold and to create a second semantic class collection comprising the semantic classes remaining after the removing from the first semantic class collection, each remaining semantic class containing the query item;
applying a topic model to a specific semantic class collection to create a plurality of topics, the topic model configured to set a topic number for each of the plurality of topics that is based on a number of semantic classes to which each of the plurality of topics could belong and is larger than the number of semantic classes to which each of the plurality of topics could belong; and
conducting a postprocessing operation on results of the topic model for each of the one or more items to merge the plurality of topics and generate a final semantic class collection used to generate a response to the query item.

19. The computer readable storage medium of claim 18, wherein the topic number is used to determine the plurality of topics used in the postprocessing operation to generate the final semantic class collection.

20. The computer readable storage medium of claim 18, wherein applying the topic model comprises:
mapping the first semantic class collection to a plurality of documents, each document in the plurality of documents containing the query item;
mapping the second semantic class collection to a plurality of words; and
treating the plurality of topics that are created as a plurality of semantic classes.

* * * * *